(12) United States Patent
Yoshitani (10) Patent No.: US 6,256,110 B1
(45) Date of Patent: Jul. 3, 2001

(54) IMAGE PROCESSING APPARATUS AND METHOD AND STORAGE MEDIUM

(75) Inventor: Akihiro Yoshitani, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/092,871

(22) Filed: Jun. 8, 1998

(30) Foreign Application Priority Data

Jun. 11, 1997 (JP) .................................................... 9-153667
Sep. 12, 1997 (JP) .................................................... 9-248529

(51) Int. Cl.[7] ............................ G06K 15/02; H04N 1/44; H04N 1/50
(52) U.S. Cl. .......................... 358/1.9; 358/530; 358/1.18; 283/114; 283/901
(58) Field of Search ..................................... 283/902, 901, 283/72, 73, 93, 113, 1.14; 358/438, 440, 1.9, 500, 501, 530, 518, 521, 1.18; 382/112, 162, 100; 399/366

(56) References Cited

U.S. PATENT DOCUMENTS

| 5,016,097 | * | 5/1991 | Shimano ............................... 358/521 |
| 5,153,908 |   | 10/1992 | Kakizawa et al. . |
| 5,257,119 |   | 10/1993 | Funada et al. ........................ 358/438 |
| 5,295,000 |   | 3/1994 | Nonoshita et al. ................... 358/444 |
| 5,340,159 | * | 8/1994 | Mowry, Jr. .............................. 283/93 |
| 5,418,602 | * | 5/1995 | Nishikawa ........................... 399/366 |
| 5,446,715 |   | 8/1995 | Satomura . |
| 5,457,540 | * | 10/1995 | Kajita .................................... 358/296 |
| 5,504,588 | * | 4/1996 | Takeuchi et al. ..................... 358/401 |
| 5,795,082 | * | 8/1998 | Shimada et al. ................. 400/120.09 |
| 5,878,162 | * | 3/1999 | Miyazaki et al. ..................... 382/162 |
| 6,002,893 | * | 12/1999 | Caruthers, Jr. et al. ............... 399/54 |

FOREIGN PATENT DOCUMENTS

666182 A1 * 8/1995 (EP) .

* cited by examiner

Primary Examiner—Scott Rogers
(74) Attorney, Agent, or Firm—Fitzpatrick, Cella, Harper & Scinto (57) ABSTRACT

In case of forming a color image by using a plurality of kinds of inks (for example, dark yellow and light yellow) of a same color system and different densities, it is an object to embed addition information into an input image while suppressing a deterioration in image quality of the input image as much as possible. To accomplish this object, in one embodiment of the invention, the addition information is added to the input image by using anyone of the plurality of kinds of inks having the optimum density.

16 Claims, 9 Drawing Sheets

IMAGE AFTER MODULATION PROCESSING IS PERFORMED

PIXELS ON WHICH MODULATION PROCESSING HAS BEEN PERFORMED ACCORDING TO DENSITY OF NEIGHBORHOOD

IMAGE PROCESSING APPARATUS AND METHOD AND STORAGE MEDIUM

BACKGROUND OF THE INVENTION

1. Field of the Invention

The invention relates to image processing apparatus and method for adding predetermined information to an input image and a storage medium in which such a method has been stored.

2. Related Background Art

Hitherto, an image recording apparatus such as an ink jet printer or the like forms a color image by ink, toner, or the like of four colors of CMYK.

In recent years, however, an ink jet printer such that not only the inks of four colors of CMYK mentioned above but also light inks of the same color system of the above respective colors are simultaneously used, thereby enabling a printing of three or more values to be performed for each color has been developed. Such an ink jet printer can form a color image of a higher image quality of higher gradation than those of the conventional ink jet printer using the inks of four colors.

In association with the realization of such a high image quality, the formation of an image which is almost similar to an original in which a copy or an image formation is inhibited is becoming possible by using the recent image recording apparatus.

To deter such an illegal image formation, a technique such that addition information to specify an image forming apparatus or an operator is embedded to all of the formed images by a form such that it is difficult to be discriminated by the human eye has been known. For example, a technique such that among the image forming colors (CMYK) of a copying apparatus, by changing an image signal of the yellow component which is the most difficult to be discriminated by the human eye, a pattern showing a manufacturing number or the like of the copying apparatus is embedded is disclosed in U.S. Pat. No. 5,257,119.

However, hitherto, with respect to a case of forming a color image by using a plurality of kinds of inks, toners, or the like having different densities in the same color system, an optimum method of embedding addition information to an input image is not yet realized.

SUMMARY OF THE INVENTION

The invention is made in consideration of the foregoing conventional example and it is an object of the invention to embed addition information into an input image while suppressing a deterioration in image quality of the input image as much as possible in case of forming a color image by using a plurality of kinds of inks, toners, or the like having different densities in the same color system (for example, yellow).

To accomplish the above object, according to a preferred embodiment of the invention, there is provided an image processing apparatus which is used together with an image forming apparatus which has recording materials corresponding to a plurality of color components and, with respect to at least a predetermined one of those plurality of color components, forms a color image by using the recording material of a first density and the recording material of a second density lower than the first density, comprising:

pattern adding means for receiving color image data and forming printing image data in which a pattern showing predetermined addition information has been added to the color image data; and output means for outputting the printing image data obtained by the pattern adding means to the image forming apparatus, wherein the pattern adding means is controlled so that the pattern showing the predetermined addition information is formed by using the recording material of the second density.

To accomplish the above object, according to another preferred embodiment of the invention, there is provided an image processing apparatus which is connected to an image forming apparatus which has recording materials corresponding to a plurality of color components and, with respect to at least a predetermined one of those plurality of color components, forms a color image by using the recording material of a first density and the recording material of a second density lower than the first density, comprising:

deciding means for deciding a pattern showing predetermined addition information selectively using either one of the recording materials of the first and second densities in accordance with the contents of an input color image;

pattern adding means for adding the pattern decided by the deciding means to the input color image; and output means for outputting the image to which the pattern was added by the pattern adding means to the image forming apparatus.

The above and other objects and features of the present invention will become apparent from the following detailed description and the appended claims with reference to the accompanying drawings.

DETAILED DESCRIPTION OF THE PREFERRED EMBODIMENTS

A preferred embodiment of the present invention will now be described hereinbelow with reference to the drawings.

Figure 2:
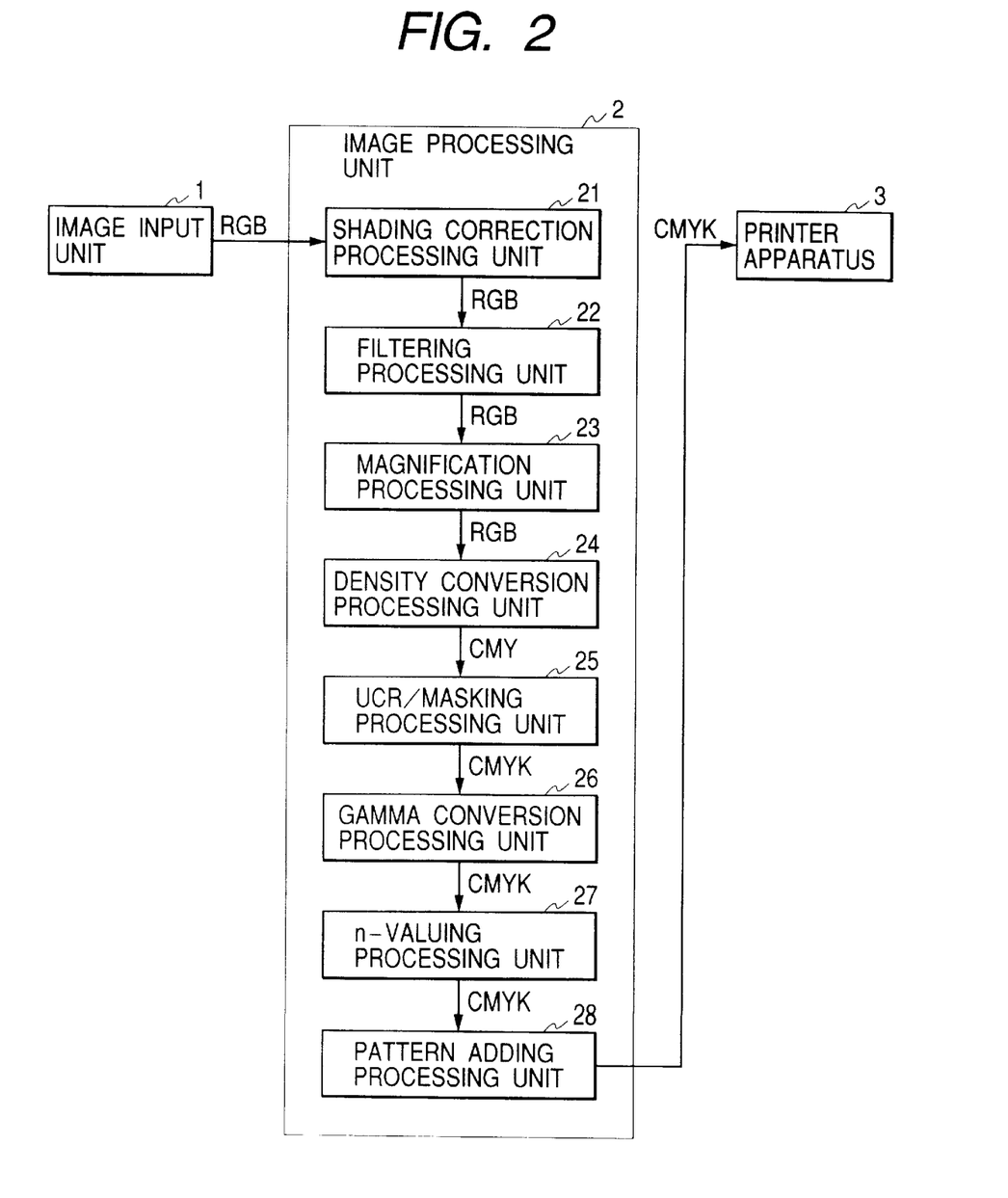
FIG. 2 is a whole diagram of an image processing apparatus for explaining an embodiment 1 of the invention.

FIG. 2 is a block diagram of an image processing apparatus which is used in the first embodiment of the invention. The embodiment will be described by using a color copying apparatus. Since the invention is characterized by the operation of a portion (pattern adding processing unit 28) for adding a pattern, it is not limited to the color copying apparatus but can be also applied to image processing units of a color printer and a color scanner.

In FIG. 2, reference numeral 1 denotes an image input unit (scanner) for scanning an original image (original) and outputting digital image data which expresses 256 gradations for each color of RGB (red, green, blue). The image data outputted from the image input unit 1 is sequentially inputted to an image processing unit 2 at the post stage in accordance with the raster scanning order.

The image processing unit 2 receives the image data of RGB from the image input unit 1 and forms n-value data of CMYK to be outputted to a printer apparatus 3 at the post stage on the basis of the image data.

A function of each section provided in the image processing unit 2 will now be described in detail hereinbelow.

In the image processing unit 2, reference numeral 21 denotes a well-known shading correction processing unit for performing a shading correction of the inputted image data. Reference numeral 22 denotes a well-known filtering processing unit for performing a smoothing process or an edge emphasis of the image data which was shading corrected by the shading correction processing unit 21.

Reference numeral 23 denotes a well-known magnification processing unit for performing a zooming process to the RGB image data which was smoothing processed or edge emphasized by the filtering processing unit 22.

Reference numeral 24 denotes a well-known density modulation processing unit for correcting the image data of RGB which was outputted from the magnification processing unit 23 and each of which consists of eight bits per color on the basis of a difference between density characteristics of the image input unit 1 and printer apparatus 3 and for converting into image data of CMY (cyan, magenta, yellow), each of which consists of eight bits per color.

Reference numeral 25 denotes a well-known UCR/masking processing unit for extracting a K (black) component on the basis of the image data of CMY which was outputted from the density modulation processing unit 24 and each of which consists of 8 bits per color and for executing a matrix arithmetic operation to match the 8-bit image data of each color of CMYK (cyan, magenta, yellow, black) which was thus obtained with color characteristics of the printer.

Reference numeral 27 denotes an n-valuing processing unit for converting the 8-bit image data of CMYK outputted from the UCR/masking processing unit 25 into n values $(256 \geq n \geq 3)$. Any one of the well-known n-value error diffusion process, n-value dither process, and the like can be selectively used for the n-valuing process. In the embodiment, explanation will be made on the assumption that n=3. The 3-value image data of CMYK which was n-valued has a value of any one of 0, 1, and 2 for each pixel and is outputted to a pattern adding processing unit 28 like C, M, Y, K, C, M, Y, K, ... in a dot-sequential manner (on a pixel unit basis).

The pattern adding processing unit 28 adds addition information, which will be explained hereinlater, to the 3-value image data of CMYK which was dot-sequentially inputted and outputs the 3-value image data of CMYK to the printer apparatus 3 in a dot-sequential manner similar to that in the n-valuing processing unit 27.

The printer apparatus 3 visualizes the 3-value image data of CMYK which was dot-sequentially outputted from the image processing unit 2 in accordance with the raster scanning order onto a predetermined recording medium. The printer apparatus 3 ejects the ink from an ink head, thereby recording an image onto the recording medium. As for the ink, the ink head has ink of a dark color (dark ink) and ink of a light color (light ink) for each color system of CMYK. Thus, three densities can be expressed per pixel with respect to each color system. Specifically speaking, 0, 1, or 2 shown by the 3-value image data of CMYK of each pixel is set as follows. That is, the pixel of 0 indicates "non-ejection of the ink", the pixel of 1 denotes "ejection of the light ink", and the pixel of 2 shows "ejection of the dark ink", respectively. In the embodiment, 81 colors can be expressed per pixel by the above ink ejection system.

A color image made by the dark inks and light inks of CMYK can be formed by the image input unit 1, image processing unit 2, and printer apparatus 3 described above.

A circuit construction and the operation of the pattern adding processing unit 28 will now be described hereinbelow with reference to FIG. 3.

Figure 3:
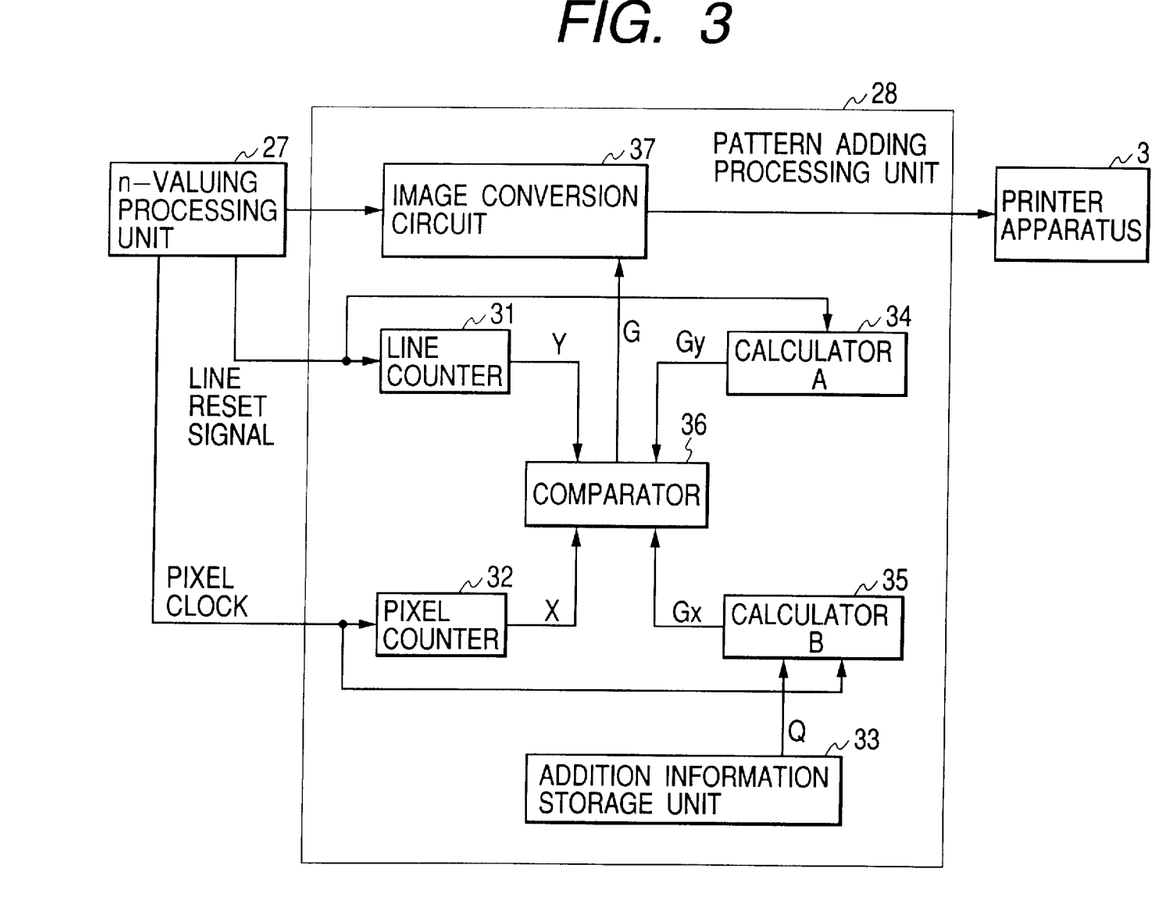
FIG. 3 is a detailed diagram of a pattern adding processing unit 28.

In FIG. 3, reference numeral 27 denotes the n-valuing processing unit at the front stage and 3 indicates the printer apparatus at the post stage.

Reference numeral 31 denotes a line counter for counting the number of line reset signals lrst which are inputted from the n-valuing processing unit 27 and obtaining a coordinate y in the sub-scanning direction of the pixel which is at present being processed. In the embodiment, the line reset signal lrst is outputted as y=1 for only a period of time of one clock when the input of the image data of one line in the image data that is inputted in accordance with the raster scanning order is finished. The signal lrst is outputted as y=0 in the other periods of time.

Reference numeral 32 denotes a pixel counter for counting the number of pixel count signals (one pixel is constructed by four signals of CMYK) clk which are inputted from the n-valuing processing unit 27 and obtaining a coordinate x in the main scanning direction of the pixel which is at present being processed. The pixel count signal clk is outputted as x=1 for only the clock when the image data of C (cyan) of each pixel is inputted. The signal clk is outputted as x=0 for the other periods of time.

Reference numeral 33 denotes an addition information storage unit for storing addition information to be added to the color image shown by the CMYK image data inputted from the n-valuing processing unit 27. In the embodiment, it is assumed that the addition information is numeral information Q and has a value which satisfies the relation of $(0 \leq Q \leq 50)$. However, the invention is not limited to such a value. A case where character information or image information is used as addition information and is embedded into the image data is also incorporated in the invention.

Reference numeral 34 denotes a calculator A for executing an arithmetic operation in accordance with an algorithm, which will be explained hereinlater with reference to FIG. 4, and outputting an output value Gy. Reference numeral 35 denotes a calculator B for also executing an arithmetic operation in accordance with an algorithm, which will be explained hereinlater, and outputting an output value Gx.

Reference numeral 36 denotes a comparator for outputting an output value G=1 only when x, Gx, and Gy satisfy conditions, which will be explained hereinlater.

Reference numeral 37 denotes an image conversion circuit for performing a conversion to only the image data of Y (yellow) in the CMYK 3-value image data which is inputted from the n-valuing processing unit 27 in accordance with the raster scanning order when the output value G of the comparator 36 is equal to 1. When the output value G=1 is inputted while the image data of Y is inputted, the Y image data is forcedly converted to 1 (value of the image data in which the printer apparatus 3 ejects the light ink). When the output value G of the comparator 36 is equal to G=0, the inputted image data is outputted to the printer apparatus 3 without being converted.

Figure 1:
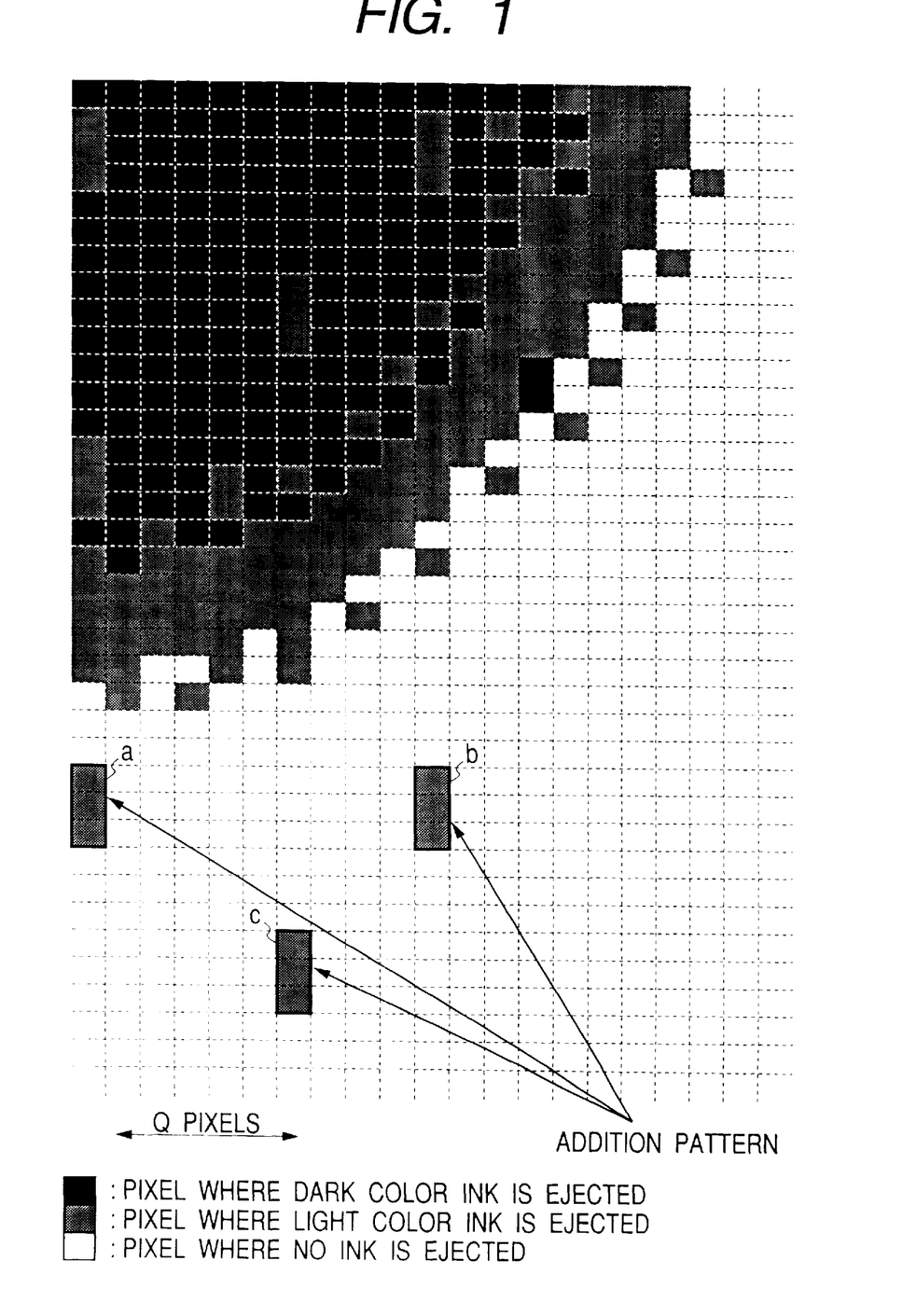
FIG. 1 is a diagram showing a state of a yellow component of an image formed after addition information had been added.
Figure 4:
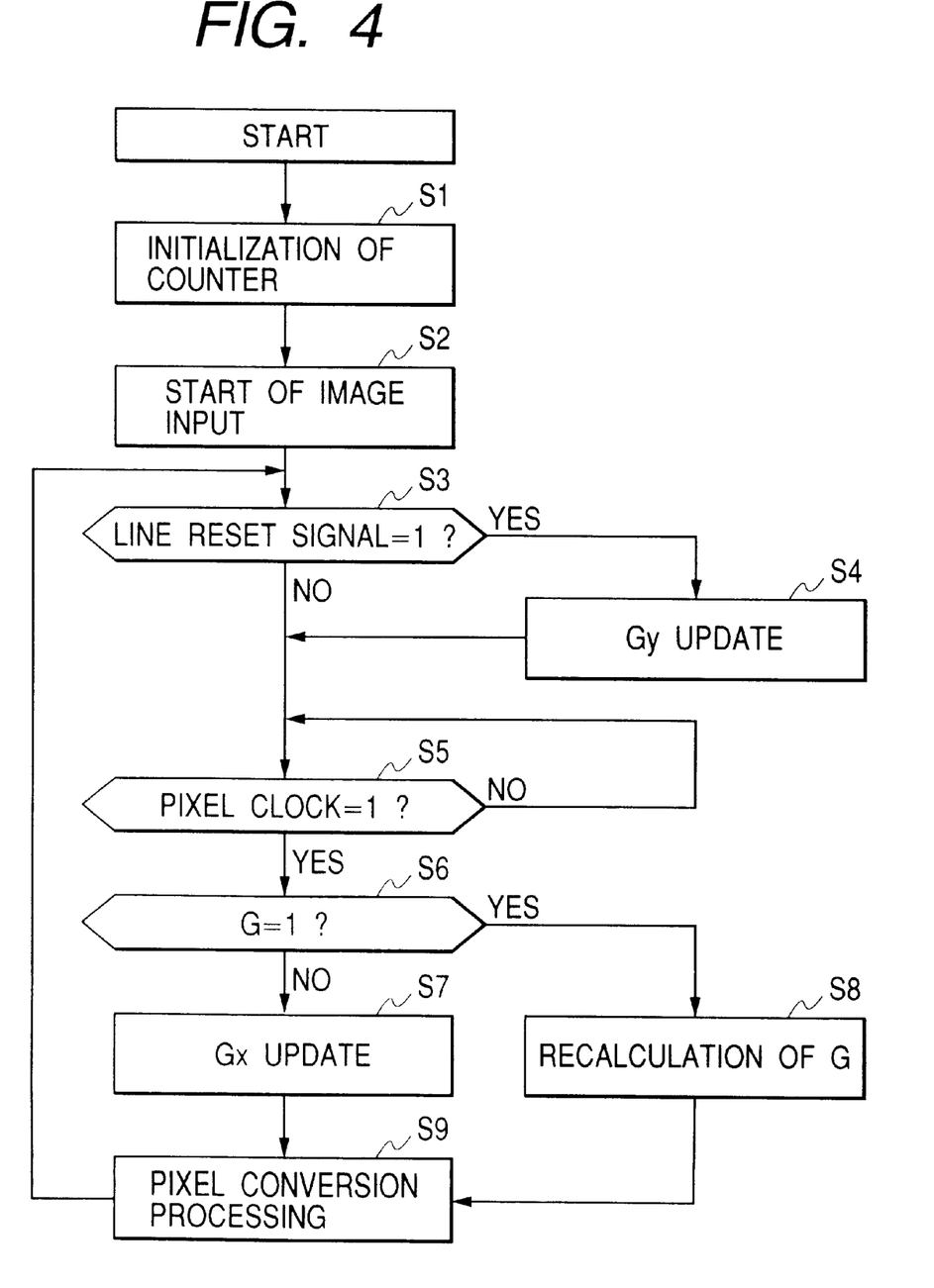
FIG. 4 is a flowchart for explaining an operation procedure of the pattern adding processing unit 28.

FIG. 4 is a diagram showing the operating procedure of FIG. 3. FIG. 1 is a diagram showing a state when the addition information is embedded by the pattern adding processing unit.

The operation of the pattern adding processing unit 28 will now be described in detail hereinbelow with reference to FIG. 4.

First in step S1, a count value y of the line counter 31, a count value x of the pixel counter 32, and the output values Gy and Gx of the calculators A and B are reset to 0. After that, the count values x and y are automatically counted in accordance with the pixel clock and the line reset signal which are inputted from the n-valuing processing unit 27.

The input of the image data from the n-valuing processing unit 27 is started in step S2.

In step S3, a check is made to see if the line reset signal lrst=1. If lrst=1, step S4 follows. If lrst=0, step S5 follows.

The value Gy is updated in step S4. That is, now assuming that $y=(2i+j)\times 6+k$ is expressed by using natural numbers i, j, and k which satisfy the relations of $(0\leq j\leq 1)$ and $(0\leq k\leq 5)$, Gy=1 is set if (k=1, 2, 3). Gy=0 is set when k is equal to other values. The processing routine advances to step S5.

In step S5, the apparatus waits until the next pixel clock is inputted from the n-valuing processing unit 27. When the pixel clock is inputted, step S6 follows.

In step S6, a check is made to see if the output value G of the comparator 36 which was updated before is equal to 1. When G=1, step S7 follows. When G=0, step S8 follows.

In step S7, Gx is updated. That is, now assuming that x is expressed by $x=60m+p$ (m and p are natural numbers: $0\leq p\leq 59$), in the case where j=0 and (k=1, 2, 3) and (p=0, 10) by using the values j and k in step S4, Gx=1 is set. Even in the case where j=1 and (k=1, 2, 3) and p=Q, Gx=1 is also set. In the other cases, Gx=0 is set. The processing routine advances to step S9.

In step S8, G is updated. That is, when x=Gx and Gy=1, G=1 is set. In the other cases, G=0 is set. The processing routine advances to step S9.

In step S9, the image conversion circuit 37 executes an image conversion processing on the basis of the output value G. That is, for the image data that is dot-sequentially inputted in accordance with the order of CMYK, if the output value G which is simultaneously inputted is equal to 1, the image data (pixel value) of Y (yellow) is forcedly converted to 1 and outputted. On the other hand, if the output value G is equal to 0, the inputted image data is outputted as it is without being converted.

The input image data of C, M, and K is outputted as it is without being converted irrespective of the output value G.

By the above processes, although the addition information is added to only the image data of Y (yellow), this is because a principle such that the image of Y is difficult to be discriminated by the human eyes is used. By constructing such that the pattern showing the addition information of the image data of Y is forcedly formed by an image of light ink, an image of a higher image quality can be formed as compared with a case of simply forming a pattern by the ink of Y (dark ink and light ink).

By adding the addition information in accordance with the flowchart as described above and printing the derived image data from the printer apparatus 3, an image as shown in FIG. 1 is obtained. FIG. 1 shows a state of the image (Y plane) constructed by only Y (yellow). Actually, a color image is formed by multiplexing a C plane, an M plane, and a K plane to the Y plane of FIG. 1.

A method of analyzing the addition information Q on the basis of the printed image will now be described hereinbelow.

First, the color image formed by the printer apparatus 3 is read by the scanner and only the Y component of the color image is extracted. Further, the pixels formed by using the dark ink and the pixels formed by using the light ink are classified on the basis of the density of the image of the Y component and the image of the Y component classified as shown in FIG. 1 is extracted.

In the image of FIG. 1, the addition information Q is constructed by three patterns of a, b, and c. Patterns a and b indicate the patterns for showing reference positions. Since an interval between a and b is equal to 10 pixels from the above adding system, a fact that the left pattern is a and the right pattern is b can be analyzed.

On the other hand, the addition information is expressed by the number of pixels in the sub-scanning direction from the pattern a to the pattern c. In case of FIG. 1, there are six pixels from the pattern a to the pattern c and a fact that the addition information Q is 6 can be analyzed.

Since the above three patterns of a, b, and c are periodically added, a possibility that a region including the three patterns can be extracted from a part of the image is high. A possibility that the addition information can be analyzed is high.

Although the number of addition information is equal to 1 in the embodiment, the invention is not limited to it. A case of adding a plurality of addition information is also incorporated. In this case, in addition to the patterns a, b, and c, if patterns c1, c2, and the like similar to the pattern c are further deviated from the pattern c in the sub-scanning direction and are added one by one, a plurality of addition information can be added.

Although the embodiment has been described with respect to the case of forming an image by using the printer apparatus of the ink jet type, the invention is not limited to such a case. A case of forming an image by using a plurality of toners of different densities in the same color system, namely, a case of forming a pattern showing the addition information by the light Y-color toner when the dark Y-color toner and light Y-color toner are used is also incorporated in the invention.

Not only a case where the printer apparatus 3 forms a color image by using the four color components of CMYK but also a case where it forms a color image by three color components of CMY is incorporated in the invention.

In the embodiment, although a circuit from the shading correction processing unit 21 to the pattern adding processing unit 28 has been regarded as one apparatus, the invention is not limited to it. A part of the image processing apparatus including the pattern adding processing unit 28 can be also regarded as one apparatus. For example, assuming that a circuit from the UCR/masking processing unit 25 to the pattern adding processing unit 28 is regarded as one apparatus, it can be regarded as an apparatus for inputting color image data of CMY. If a circuit from the n-valuing processing unit 27 to the pattern adding processing unit 28 is regarded as one apparatus, it can be regarded as an apparatus for inputting a color image data of CMYK.

According to the embodiment as described above, there is provided the image processing apparatus which is used together with an image forming apparatus which has recording materials corresponding to a plurality of color components and, with respect to at least a predetermined one of those plurality of color components, forms a color image by using the recording material of the first density and the recording material of the second density lower than the first density, comprising: the pattern adding means for receiving color image data and forming printing image data in which the pattern showing predetermined addition information has been added to the color image data; and the output means for outputting the printing image data obtained by the pattern adding means to the image forming apparatus, wherein the pattern adding means controls so that the pattern showing the predetermined addition information is formed by using the recording material of the second density. Therefore, in case of forming a color image by using a plurality of kinds of inks having different densities in the same color system, the addition information can be embedded into the input image so that it is difficult to be discriminated by the human eye while suppressing a deterioration in image quality of the input image as much as possible.

The second embodiment according to the invention will now be described in detail hereinbelow with reference to the drawings.

Figure 7:
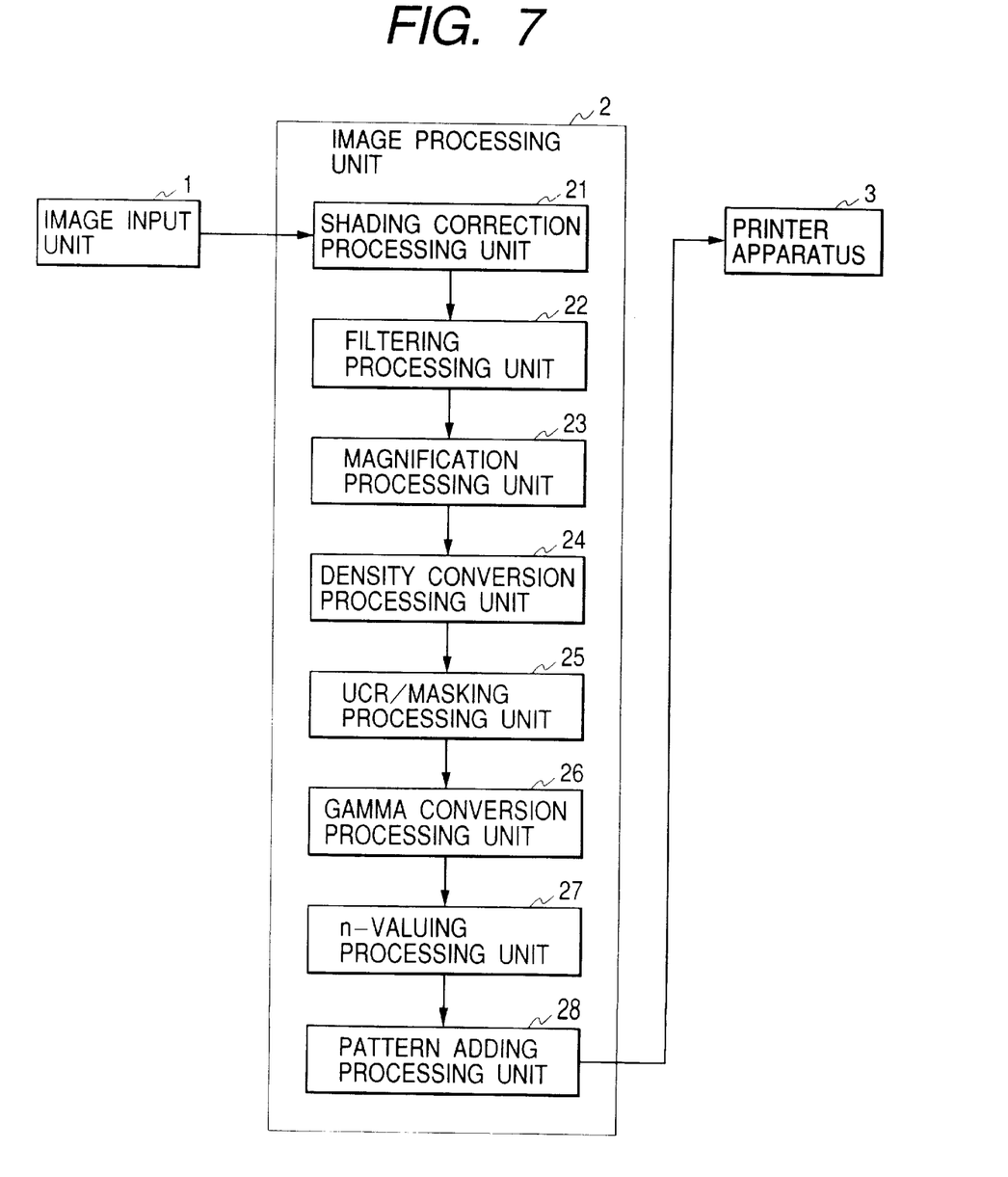
FIG. 7 is an internal constructional diagram of an image processing apparatus which is used in an embodiment 2.

FIG. 7 is a block diagram of an image processing apparatus which is used in the embodiment. The embodiment will be described by using a color copying apparatus. The invention is characterized by the operation of a portion (pattern adding processing unit 28) for adding a pattern. Therefore, the apparatus itself is not limited to the color copying apparatus. A case of applying the embodiment to an image processing unit of a color printer or a color scanner is also incorporated in the invention.

In FIG. 7, reference numeral 1 denotes the image input unit (scanner) for scanning an original image (original) and outputting digital image data which expresses 256 gradations for each of RGB (red, green, blue). The image data outputted from the image input unit 1 is sequentially inputted to the image processing unit 2 at the post stage in accordance with the raster scanning order.

The image processing unit 2 receives the image data of RGB from the image input unit 1 and forms n-value data of CMYK to be outputted to the multivalue printer apparatus 3, which will be explained hereinlater.

A function of each section provided in the image processing unit 2 will now be described in detail hereinbelow.

In the image processing unit 2, reference numeral 21 denotes the well-known shading correction processing unit for performing a shading correction of the inputted image data. Reference numeral 22 denotes the well-known filtering processing unit for performing a smoothing process or an edge emphasis of the image data which was shading corrected by the shading correction processing unit 21.

Reference numeral 23 denotes the well-known magnification processing unit for performing a zooming process to the RGB image data which was smoothing processed or edge emphasized by the filtering processing unit 22.

Reference numeral 24 denotes the well-known density modulation processing unit for correcting the image data of RGB which was outputted from the magnification processing unit 23 and each of which consists of eight bits per color on the basis of a difference between density characteristics of the image input unit 1 and printer apparatus 3 and for converting into image data of CMY (cyan, magenta, yellow) each of which consists of eight bits per color.

Reference numeral 25 denotes the well-known UCR/masking processing unit for extracting a K (black) component on the basis of the image data of CMY which was outputted from the density modulation processing unit 24 and each of which consists of 8 bits per color and for executing a matrix arithmetic operation to match the 8-bit image data of CMYK (cyan, magenta, yellow, black) which was thus obtained with color characteristics of the printer.

Reference numeral 27 denotes the n-valuing processing unit for converting the 8-bit image data of CMYK outputted from the UCR/masking processing unit 25 into n values ($256 \geq n \geq 3$). Any one of the well-known n-value error diffusion process, n-value dither process, and the like can be selectively used for the n-valuing process. In the embodiment, explanation will be made on the assumption that n=3.

The 3-value image data of CMYK which was n-valued has a value of any one of 0, 1, and 2 for each pixel and is outputted to a pattern adding processing unit 28 like C, M, Y, K, C, M, Y, K, ... in a dot-sequential manner (on a pixel unit basis).

The pattern adding processing unit 28 adds addition information, which will be explained hereinlater, to the 3-value image data of CMYK which was dot-sequentially inputted and outputs the 3-value image data of CMYK to the printer apparatus 3 in a dot-sequential manner similar to that in the n-valuing processing unit 27.

The printer apparatus 3 visualizes the 3-value image data of CMYK which was dot-sequentially outputted from the image processing unit 2 in accordance with the raster scanning order onto a predetermined recording medium.

The printer apparatus 3 ejects the ink from an ink head, thereby recording an image onto the recording medium. As for the ink, the ink head has ink of a dark color (dark ink) and ink of a light color (light ink) for each color system of CMYK. Thus, three densities can be expressed per pixel with respect to each color system.

Specifically speaking, 0, 1, or 2 shown by the 3-value image data of CMYK of each pixel is set as follows. That is, the pixel of 0 indicates "non-ejection of the ink", the pixel of 1 denotes "ejection of the light ink", and the pixel of 2 shows "ejection of the dark ink", respectively. In the embodiment, 81 (=3×3×3×3) colors can be expressed per pixel by the above ink ejection system.

A color image made by the dark inks and light inks of CMYK can be formed by the image input unit 1, image processing unit 2, and printer apparatus 3 described above.

A circuit construction and the operation of the pattern adding processing unit 28 will now be described hereinbelow with reference to FIG. 8.

Figure 8:
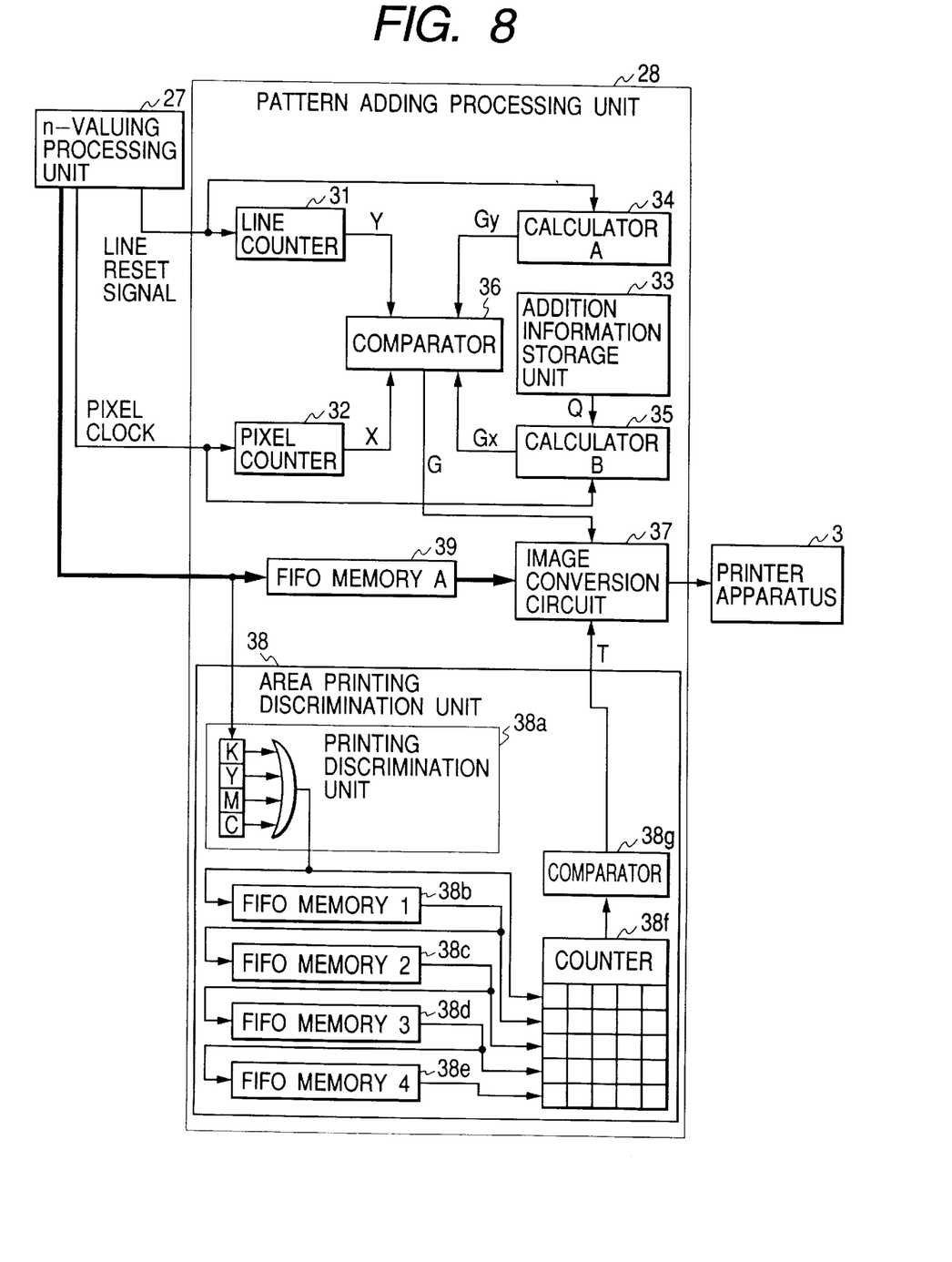
FIG. 8 is an internal constructional diagram of the pattern adding processing unit 28.

In FIG. 8, reference numeral 27 denotes the n-valuing processing unit at the front stage and 3 indicates the printer apparatus at the post stage. Reference numeral 31 denotes the line counter for counting the number of line reset signals lrst which are inputted from the n-valuing processing unit 27 and obtaining a coordinate y in the sub-scanning direction of the pixel which is at present being processed. In the embodiment, the line reset signal lrst is outputted as y=1 for only a period of time of one clock when the input of the image data of one line in the image data that is inputted in accordance with the raster scanning order is finished. The signal lrst is outputted as y=0 for the other periods of time.

Reference numeral 32 denotes the pixel counter for counting the number of pixel count signals (one pixel is constructed by four signals of CMYK) clk which are inputted from the n-valuing processing unit 27 and obtaining a coordinate x in the main scanning direction of the pixel which is at present being processed. The pixel count signal clk is outputted as x=1 for only the first one clock when the image data of C (cyan) of each pixel is inputted. The signal clk is outputted as x=0 for the other periods of time.

Reference numeral 33 denotes the addition information storage unit for storing addition information to be added to the color image shown by the CMYK image data inputted from the n-valuing processing unit 27. In the embodiment, it is assumed that the addition information is the numeral information Q and has a value which satisfies the relation of ($0 \leq Q \leq 50$). However, the invention is not limited to such a value. A case where character information or image information is used as addition information and is embedded into the image data is also incorporated in the invention.

Reference numeral 34 denotes the calculator A for executing an arithmetic operation in accordance with an algorithm, which will be explained hereinlater with reference to FIG. 9, and outputting the output value Gy. Reference numeral 35 denotes the calculator B for also executing an arithmetic operation in accordance with an algorithm, which will be explained hereinlater, and outputting the output value Gx.

Reference numeral 36 denotes the comparator for outputting the output value G=1 only when x, Gx, and Gy satisfy conditions, which will be explained hereinlater.

Reference numeral 37 denotes the image conversion circuit for performing a conversion to only the image data of Y (yellow) in the CMYK 3-value image data which is inputted from an FIFO memory A 39, which will be explained hereinlater in accordance with the raster scanning order, when the output value G of the comparator 36 is equal to 1. According to this circuit, a method whereby when the input value G=1 is inputted while the image data of Y is inputted, the Y image data is converted in accordance with an input value T from an area printing discrimination unit 38, which will be explained hereinlater, is changed.

Specifically speaking, when the value of T is equal to 1, the output value of Y is forcedly converted to 2. In the other cases, the output value of Y is forcedly converted to 1. When G is not equal to 1 and when the input image data is C, M, and K, the input image is outputted as it is without being converted.

Reference numeral 38 denotes the area printing discrimination unit for first discriminating whether there is a printing output in a pixel or not with respect to each pixel and subsequently referring to a discrimination result in a range of (5×5) pixels, thereby discriminating whether printing pixels of a predetermined number or more exist in a near area around a certain pixel as a center or not. Each processing unit in the area printing discrimination unit 38 will now be described.

Reference numeral 38a denotes a printing discrimination unit for storing n-valuing processing results (2 bits×4) of CMYK as much as one pixel and obtaining the OR of all of those bits, thereby discriminating whether the ink is ejected in at least one of C, M, Y, and K for the pixel or not. After that, a result of the OR is called a pixel printing discrimination result. If it is equal to 1, some ink is ejected for such a pixel.

Reference numerals 38b, 38c, 38d, and 38e denote FIFO memories 1 to 4 for storing the pixel printing discrimination result as an output of the printing discrimination unit 38a by an amount of every one output line. Each cell of the FIFO memory is equal to one bit. By using them, the pixel printing discrimination results of as many as four lines are stored and pixel printing discrimination results of an area of (5×5) pixels are simultaneously supplied to a counter 38f, which will be explained hereinlater.

The counter 38f stores outputs of five lines of the printing discrimination unit 38a and FIFO memories 38b to 38e by an amount of every five pixels with respect to each line, counts printing discrimination results of as many as 25 total pixels of the area of (5×5) pixels around a certain pixel a as a center, and examines the number of printing pixels existing in such an area. A count result is hereinafter called an area printing pixel number. For example, when the area printing pixel number is equal to 0, the area of (5×5) pixels around the pixel α as a center is a complete white area where no ink is printed.

Reference numeral 38g denotes a comparator for comparing the area printing pixel number as an output result of the counter 38f with a preset constant value K. When an output result of the counter 38f is equal to or larger than K, an output T is set to 0 (showing that a density of the peripheral area including the printing target pixel is equal to or larger than a predetermined value). When it is less than K, the output T is set to 1 (showing that the density of the peripheral area including the printing target pixel is lower than the predetermined value).

By the process in the area printing discrimination unit 38, among 25 pixels in the area of (5×5) pixels around a certain pixel a as a center, whether the number of pixels in which the ink is outputted is less than the predetermined number K or not can be examined.

In the embodiment, when the discrimination result T is equal to 1, such an area is regarded as a white area.

Hitherto, in case of adding the addition information by converting the original image (only the Y data), the density modulation is performed so that the Y data constructs a pattern formed by the ink of a predetermined density. In the embodiment, however, by paying attention to a point that an image is formed by using a plurality of inks (in this case, particularly, Y ink) of the same color and different densities, in the case where an area (the pixel as a conversion target can be also included) near the pixel where the density modulation is executed is the white area, even if the addition information is added by using the light ink in place of the ink (in the embodiment, it is assumed a dark ink) which is used when adding the ordinary addition information (pattern), whether the density converted pixel corresponds to the pattern of the addition information or not can be easily recognized.

It is a general case where most of a printing image which is outputted as a visible image from a copying apparatus or a printer is occupied by the white area. Therefore, by controlling so as to switch a density of ink forming the addition information in accordance with the density of the original image as mentioned above, a situation such that a pattern formed by the ink of a high density is added into the white area and the addition of the addition information (pattern) becomes conspicuous can be reduced as much as possible.

Reference numeral 39 denotes the FIFO memory A to store the processing result of the n-valuing processing unit 27 of as much as two lines. The reason why the FIFO memory A is provided is because since the discrimination output T of the area printing discrimination unit 38 is delayed than relative to the output of the n-valuing processing unit 27 by a time corresponding to two lines, it is necessary to match the timing with it. That is, the timing is matched in a manner such that when the pixel to be processed by the image conversion circuit 37 is α, the comparison result T between the area printing pixel number of the area of (5×5) pixels around the pixel α and the constant K is just outputted.

Figure 9:
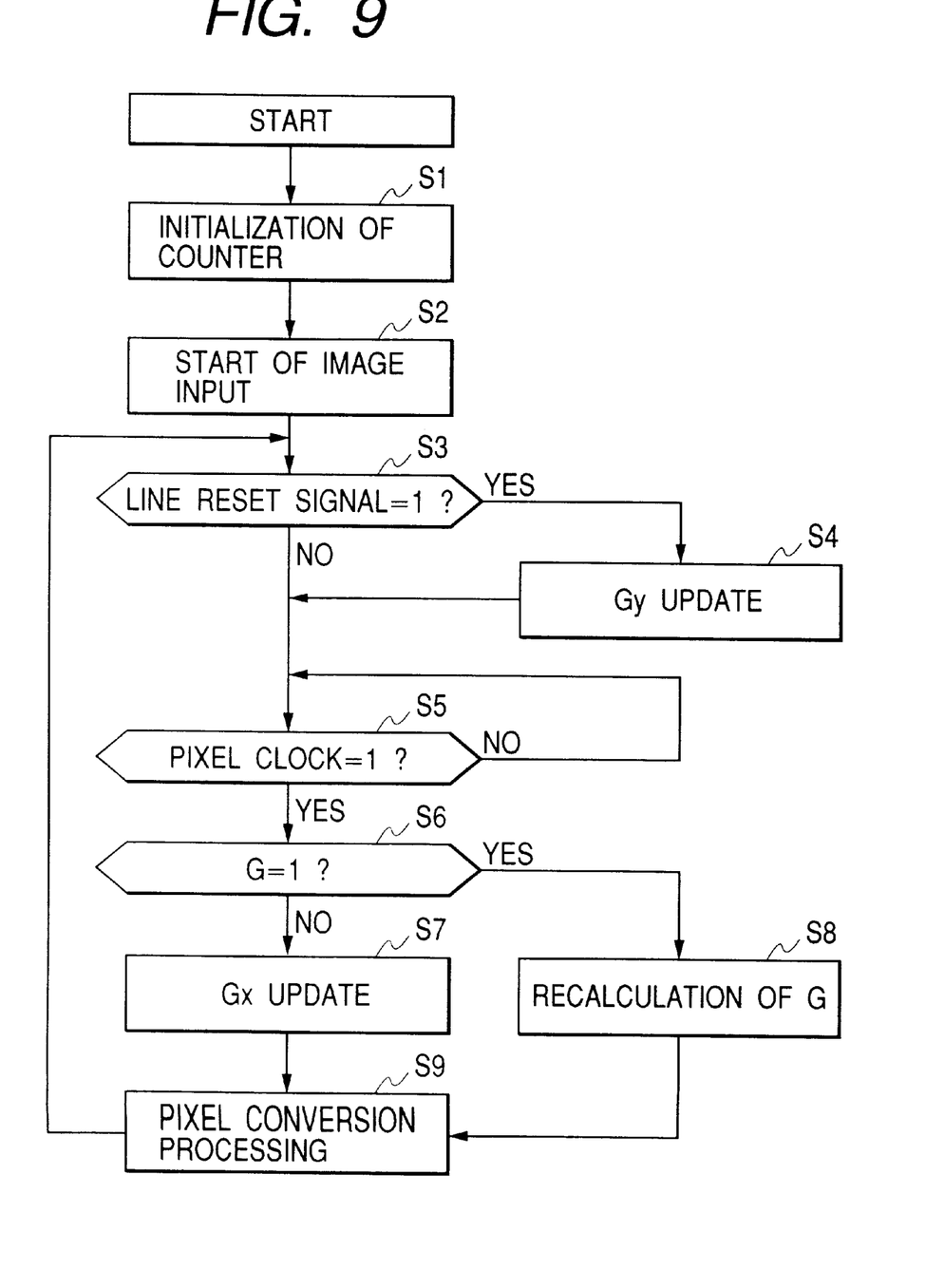
FIG. 9 is a flowchart showing a procedure when a pattern showing addition information is added in the embodiment 2.

FIG. 9 is a flowchart showing a series of processes in the embodiment.

Figure 5:
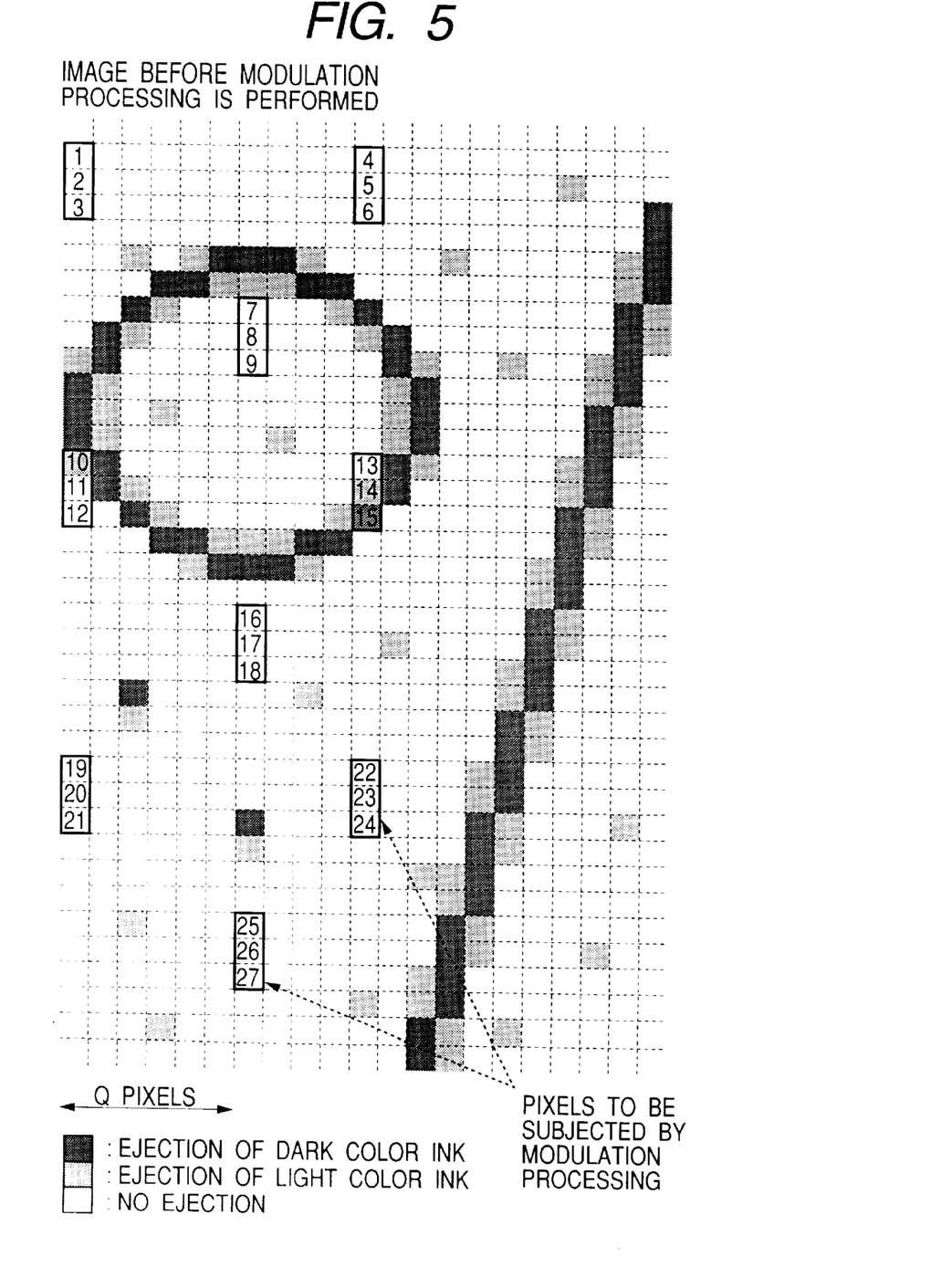
FIG. 5 is a diagram showing an image of a yellow plane which was outputted from an n-valuing processing unit 27 and inputted to the pattern adding processing unit 28.
Figure 6:
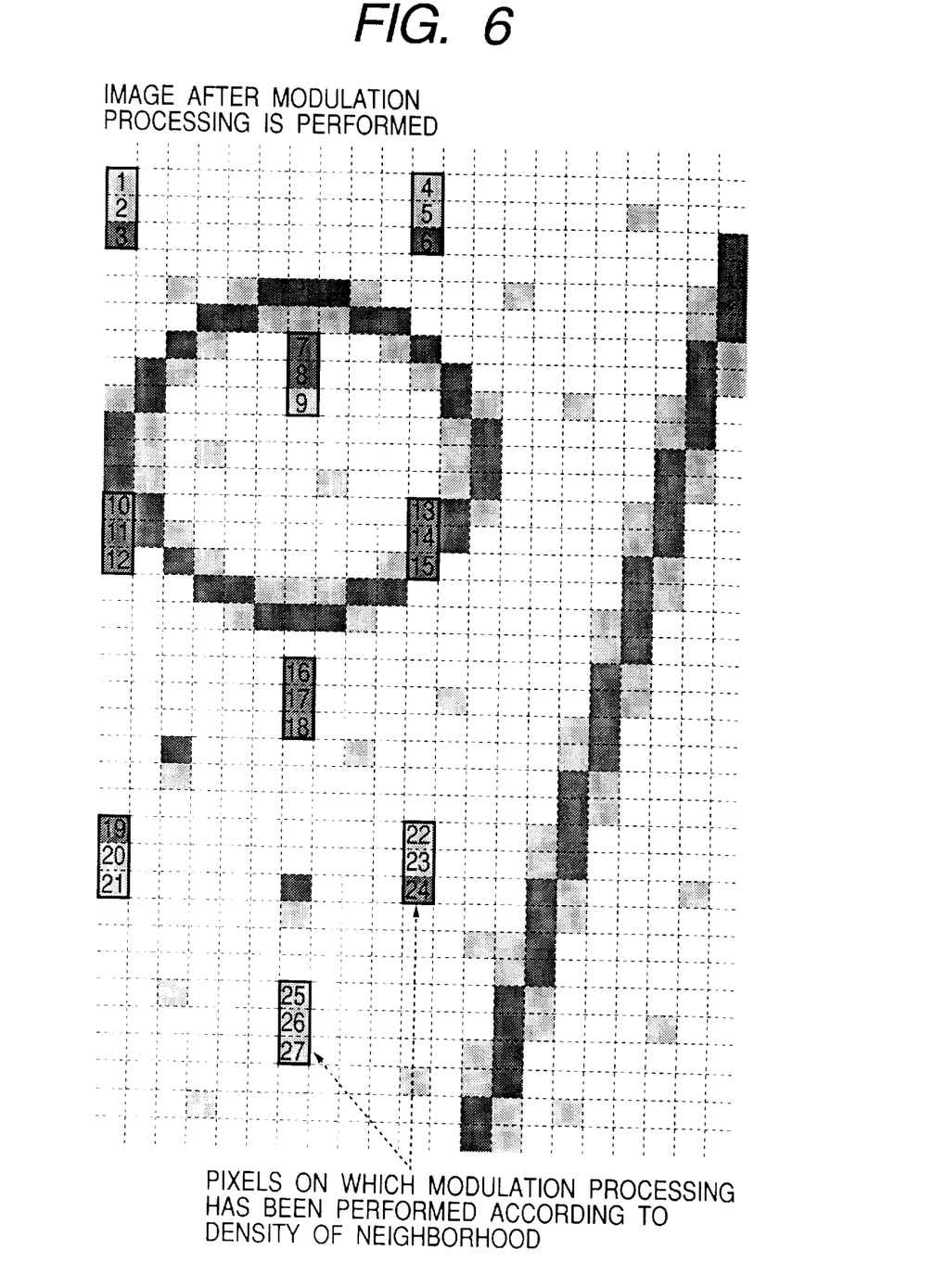
FIG. 6 is a diagram showing an image of a yellow plane after a pattern showing the addition information was added by the pattern adding processing unit 28.

FIG. 5 is a diagram showing an image before the density modulation is executed by the embodiment, namely, the inputted original image. FIG. 6 is a diagram showing an image after the pattern indicative of the addition information was added to the original image. In the embodiment, since the addition information is added to only the Y (yellow) data of the image, FIGS. 5 and 6 show the Y plane images which are expressed by only the Y data, respectively.

The operation of the pattern adding processing unit 28 will now be described in detail hereinbelow with reference to those diagrams.

First in step S1, the count value of the main scanning counter x, the count value of the sub-scanning counter y, Gx, and Gy are reset to 0. After that, it is assumed that the main scanning counter x and the sub-scanning counter y automatically operate in accordance with the pixel clock and the line reset signal.

In step S2, the image input is started.

In step S3, a check is made to see if the line reset signal lrst=1. When it is equal to 1, step S4 follows. If NO, step S5 follows.

In step S4, Gy is updated.

In this instance, now assuming that y is expressed as follows $$y=(2i+j)\times 6+k$$

by using the natural numbers i, j, and k which satisfy ($0 \leq j \leq 1$, $0 \leq k \leq 5$), if k=1 or 2 or 3, Gy=1, and if k is other than 1, 2 and 3, Gy=0, and the processing routine advances to step S5.

In step S5, the apparatus waits until the next pixel clock is inputted. When the clock is inputted, step S6 follows.

In step S6, a check is made to see if the output G of the comparator 36 updated in the previous step is equal to 1. If G=1, step S7 follows. If G=0, step S8 follows.

In step S7, Gx is updated.

Now, assuming that $$x=60m+p \text{ (m and p are natural numbers: } 0 \leq p \leq 59)$$

by using the values j and k in step S4, if j=0 and (k=1 or k=2) and (p=0 or p=10), Gx=1, and if j=1 and (k=1 or k=2) and p=Q, Gx=1, and in the other cases, Gx=0.

The processing routine advances to step S8.

In step S8, G is updated.

It is now assumed that when x=Gx and Gy=1, G=1, and in the other cases, G=0.

The processing routine advances to step S9.

In step S9, the pixel conversion processing is executed in the image conversion circuit 37.

Specifically speaking, the following processes are executed to the image data which is sequentially inputted in accordance with the order of CMYK.

(1) When the value of G at that time point is equal to 1 (G is equal to 1 at specific coordinates due to the value of Q irrespective of the contents of the image; the conversion processing is executed to the Y data of the coordinates), (1-a) if the value of T at that time point is equal to 1 (the area printing pixel number around the target pixel is less than K), only the pixel value of Y is converted to 1 and is outputted, and (1-b) if the value of T at that time point is equal to 0 (the area printing pixel number around the target pixel is equal to or larger than K), only the pixel value of Y is converted to 0 and is outputted.

(2) When the value of G at that time point is equal to 0, the pixel value of Y is outputted as it is without being converted.

With respect to all of CMK, the same value as the input value is outputted. The processing routine is returned to step S3.

By executing the processes in accordance with the flowchart as mentioned above, an output image in which the conversion processing has been performed in the yellow pixel at specific coordinates to the input image (output image from the n-valuing processing unit) is obtained.

FIG. 5 shows an example of the input Y image and the output Y image when the conversion processing is executed to the output Y image of the n-valuing processing unit by the method of the embodiment. For simplicity of explanation, it is now assumed that K=1 and the process with respect to the remaining CMK images of CMYK will be explained in a manner similar to the case of the white image (no image is printed).

In FIG. 5, the pixels (pixels 1 to 27) to which numbers were added are pixels to which the density modulation should be performed to show the pattern indicative of the addition information. Among those pixels, with regard to the pixels 1, 2, 4, 5, 9, 20, 21, 22, 23, 25, 26, and 27, since the number of printing pixels (pixels where the dark ink or light ink is ejected) existing in the area of (5×5) pixels around the target pixel as a center is equal to 0 ($\leq K$), the density modulation is performed so that the light ink is ejected for the Y data.

On the other hand, as for the remaining pixels 3, 6, 7, 8, 10, 11, 12, 13, 14, 15, 16, 17, 18, 19, and 24, since the number of printing pixels existing in the area of (5×5) pixels around the target pixel is equal to or larger than K, the density modulation is performed so that the dark ink is ejected for the Y data.

The image shown in FIG. 6 is derived by executing the density modulation in accordance with the foregoing method. When comparing with the image by the conventional embodiment in which the addition information constructed by one density (for example, in the embodiment, only the dark ink of yellow) is added, according to the image shown in FIG. 6, the execution of the density modulation can be made extremely inconspicuous and the deterioration in image quality can be suppressed as compared with that in the conventional method.

When the addition information is decoded from the image as shown in FIG. 6 which was printed and outputted, like pixels surrounded by bold lines in FIG. 6, the addition pattern of three vertical pixels constructed by the light Y ink or dark Y ink is first read out from the printing output, and a phase difference in the sub-scanning direction between the patterns is counted on the basis of the number of pixels, so that the information of Q can be read. In the embodiment, even if the pattern was constructed by using the light ink, it is guaranteed that the periphery of the converted portion is a white area (area of a predetermined density or less). Therefore, such a pattern can be easily recognized.

The above embodiment has been described with respect to the case of forming an image by using the printer apparatus of the ink jet system. However, the invention is not limited to such a case. In case of forming an image by using a plurality of toners of different densities of the same color system, any apparatus is incorporated in the invention, for example, so long as the dark Y color toner and the light Y color toner are selectively used in accordance with a state of the area near the pixel to which the pattern should be added, thereby forming the pattern showing the addition information.

Not only the case where the printer apparatus 3 forms a color image by selectively using the four color components of CMYK but also a case of forming a color image by three colors of CMY is incorporated in the invention.

In the embodiment, although the circuit from the shading correction processing unit 21 to the pattern adding processing unit 28 is regarded as one apparatus, the invention is not limited to it. A part of the image processing apparatus including the pattern adding processing unit 28 can be also regarded as one apparatus. For example, if the circuit from the UCR/masking processing unit 25 to the pattern adding processing unit 28 is regarded as one apparatus, it can be considered as an apparatus for inputting the color image data of CMY. If the n-valuing processing apparatus 27 and pattern adding processing unit 28 are regarded as one apparatus, they can be regarded as an apparatus for inputting the color image data of CMYK.

According to the foregoing embodiment, in the image processing apparatus which is connected to the image forming apparatus which has recording materials (YMCK in the embodiment) corresponding to a plurality of color components and forms a color image by using the recording material (dark Y ink) of the first density with respect to at least one predetermined color component (Y in the embodiment) among those plurality of color components and the recording material (light Y ink) of the second density lower than the first density, the pattern using only the first recording material, or only the second recording material, or the combination of the first and second recording materials is added to the original image in accordance with the contents of the input color image (in the embodiment, the ambient density of each pixel to which the pattern is added). Thus, the addition information can be embedded while suppressing the deterioration in image quality of the original image as much as possible.

In the above embodiment, although the density of the pattern shown in FIG. 2 has been decided in accordance with the ambient density at the position where the pattern is added, the invention is not limited to it. For example, in the case where a character, a diagram area, a CG area, a photograph area, a blank area, and the like mixedly exist in one picture plane, a case of switching the density of the Y ink forming the pattern in every area is also incorporated in the invention.

As another embodiment, the invention can be also applied as a part of a system constructed by a plurality of apparatuses (for example, a host computer, an interface device, a reader, a printer, and the like) or can be also applied to a part of an apparatus comprising one apparatus (for example, copying apparatus, facsimile apparatus).

The invention is not limited to only the apparatus and method for realizing the embodiment. The invention also incorporate a case where program codes of software to realize the embodiment are supplied to a computer (CPU or MPU) in the system or apparatus and the computer of the system or apparatus makes the above various devices operative in accordance with the program codes, thereby realizing the embodiment.

In this case, the program codes themselves of the software realize the above embodiment. The program codes themselves and means for supplying the program to a computer, specifically speaking, a storage medium in which the program codes have been stored are also incorporated in the purview of the invention.

As a storage medium for storing such program codes, for example, it is possible to use any one of a floppy disk, a hard disk, an optical disk, a magnetooptic disk, a CD-ROM, a magnetic tape, a non-volatile memory card, a ROM, and the like.

Not only a case where the function of the embodiment is realized by controlling the various devices by the computer in accordance with only the supplied program codes but also a case where the above embodiment is realized in cooperation with the OS (operating system) by which the program codes are operating on the computer or another application software or the like are also incorporated in the scope of the invention.

Further, the invention also incorporates a case where the supplied program codes are stored into a memory provided for a function expansion board of a computer or a function expansion unit connected to the computer and, after that, a CPU or the like provided for the function expansion board or function expansion unit executes a part or all of the actual processes on the basis of an instruction of the program codes, and the embodiment is realized by those processes.

According to the invention as described above, in case of forming a color image by using a plurality of kinds of inks, toners, or the like having different densities of the same color system, the addition information can be embedded to the input image while suppressing the deterioration in image quality of the input image as much as possible.

The present invention is not limited to the foregoing embodiments but many modifications and variations are possible within the spirit and scope of the appended claims of the invention.

What is claimed is:

1. An image processing apparatus which is used together with an image forming apparatus which has recording materials corresponding to a plurality of color components and, with respect to at least a predetermined one of said plurality of color components, forms a color image by using recording material of a first density and recording material of a second density lower than said first density, comprising:

pattern adding means for receiving color image data and forming printing image data in which a pattern showing predetermined addition information has been added to said color image data; and output means for outputting the printing image data obtained by said pattern adding means to said image forming apparatus, wherein said pattern adding means is controlled so that the pattern showing said predetermined addition information is forcedly formed by using only said recording material of the second density.

2. An apparatus according to claim 1, wherein said plurality of color components include cyan, magenta, and yellow.

3. An apparatus according to claim 2, wherein said plurality of color components further include black.

4. An apparatus according to claim 1, wherein said predetermined one color component is a yellow component.

5. An apparatus according to claim 1, wherein said recording material is ink.

6. An apparatus according to claim 1, wherein said recording material is toner.

7. An apparatus according to claim 1, further including said image forming apparatus.

8. An apparatus according to claim 1, further comprising image reading means for reading an original and generating said color image data.

9. An apparatus according to claim 1, wherein image data indicative of red, green, and blue components is included in said color image data.

10. An apparatus according to claim 1, wherein image data indicative of cyan, magenta, and yellow is included in said color image data.

11. An apparatus according to claim 1, wherein image data indicative of cyan, magenta, and yellow components is included in said printing image data.

12. A control method of an image processing apparatus which is used together with an image forming apparatus which has recording materials corresponding to a plurality of color components and, with respect to at least a predetermined one of said plurality of color components, forms a color image by using recording material of a first density and recording material of a second density lower than said first density, comprising:

a pattern adding step of receiving color image data and forming printing image data in which a pattern showing predetermined addition information has been added to said color image data; and an output step of outputting the printing image data obtained by said pattern adding step to said image forming apparatus, wherein said pattern adding step is controlled so that the pattern showing said predetermined addition information is forcedly formed by using only said recording material of the second density.

13. A storage medium in which a control program for an image processing apparatus which is used together with an image forming apparatus which has recording materials corresponding to a plurality of color components and, with respect to at least a predetermined one of said plurality of color components, forms a color image by using recording material of a first density and recording material of a second density lower than said first density has been stored in a state where said control program can be read out from a computer, said control program comprising:

a pattern adding step of receiving color image data and forming printing image data in which a pattern showing predetermined addition information has been added to said color image data; and an output step of outputting the printing image data obtained by said pattern adding step to said image forming apparatus, wherein said pattern adding step is controlled so that the pattern showing said predetermined addition information is forcedly formed by using only said recording material of the second density.

14. An image processing apparatus which is used together with an image forming apparatus which has a plurality of recording materials of different densities of a same system color and forms a color image by using recording material of a first density and recording material of a second density lower than said first density which are included among said plurality of recording materials, comprising:

pattern adding means for receiving image data and forming printing image data in which a pattern showing predetermined addition information has been added to said image data; and output means for outputting the printing image data obtained by said pattern adding means to said image forming apparatus, wherein said pattern adding means is controlled so that the pattern showing said predetermined addition information is forcedly formed by using only said recording material of the second density.

15. A control method of an image processing apparatus which is used together with an image forming apparatus which has a plurality of recording materials of different densities of a same system color and forms a color image by using recording material of a first density and recording material of a second density lower than said first density which are included among said plurality of recording materials, comprising:

a pattern adding step of receiving image data and forming printing image data in which a pattern showing predetermined addition information has been added to said image data; and an output step of outputting the printing image data obtained by said pattern adding step to said image forming apparatus, wherein said pattern adding step is controlled so that the pattern showing said predetermined addition information is forcedly formed by using only said recording material of the second density.

16. A storage medium in which a control program, which is for an image processing apparatus which is used together with an image forming apparatus which has a plurality of recording materials of different densities of a same system color and forms a color image by using recording material of a first density and recording material of a second density lower than said first density which are included among said plurality of recording materials, has been stored in a state where said control program can be read out from a computer, said control program comprising:

a pattern adding step of receiving image data and forming printing image data in which a pattern showing predetermined addition information has been added to said image data; and an output step of outputting the printing image data obtained by said pattern adding step to said image forming apparatus, wherein said pattern adding step is controlled so that the pattern showing said predetermined addition information is forcedly formed by using only said recording material of the second density.

* * * * *

UNITED STATES PATENT AND TRADEMARK OFFICE
CERTIFICATE OF CORRECTION

PATENT NO.    : 6,256,110 B1
DATED         : July 3, 2001
INVENTOR(S)   : Yoshitani It is certified that error appears in the above-identified patent and that said Letters Patent is hereby corrected as shown below:

Drawings,
Sheet 5, Figure 5, "BY" should read -- TO --.

Column 5,
Line 62, "eyes" should read -- eye --.

Column 7,
Line 66, "yellow)" should read -- yellow), --.

Column 10,
Line 8, "pixel a" should read -- pixel ∝ --.
Line 27, "pixel a" should read -- pixel ∝ --.
Line 64, "than" should be deleted.

Column 12,
Line 37, "(≦K)," should read -- (<K), --.

Column 13,
Line 64, "incorporate" should read -- incorporates --.

Signed and Sealed this

Sixteenth Day of April, 2002

JAMES E. ROGAN
*Director of the United States Patent and Trademark Office*